United States Patent [19]
DiRisio

[11] Patent Number: 5,652,934
[45] Date of Patent: Jul. 29, 1997

[54] SPINDLE LOCK

[75] Inventor: Anthony DiRisio, Rochester, N.Y.

[73] Assignee: Eastman Kodak Company, Rochester, N.Y.

[21] Appl. No.: 610,020

[22] Filed: Mar. 4, 1996

[51] Int. Cl.⁶ ............................................. G03B 17/00
[52] U.S. Cl. ........................................................ 396/411
[58] Field of Search ................................. 396/387, 411, 396/389, 390, 395, 396

[56] References Cited

U.S. PATENT DOCUMENTS 3,780,634  12/1973  VanOsch ............................. 396/512
4,149,793   4/1979  Date ................................... 396/405
5,231,438   7/1993  Smart ................................. 396/522

Primary Examiner—David M. Gray
Attorney, Agent, or Firm—Roger A. Fields

[57] ABSTRACT

Apparatus comprising a chamber for receiving a film cartridge, a rotatable driver engageable coaxially with rotatable film moving means in a housing of the film cartridge for rotating the film moving means to advance a filmstrip from the housing when the film cartridge is received in the chamber, and locking means for preventing rotation of the driver, is characterized in that the driver is engageable with the locking means to prevent rotation of the driver only when the film cartridge is removed from the chamber.

7 Claims, 3 Drawing Sheets

SPINDLE LOCK

FIELD OF THE INVENTION

The invention relates generally to the field of photography. More specifically, the invention relates to a drive spindle or the like for rotating a film spool of a film cartridge in a camera, for example, and to a spindle lock for arresting the drive spindle in a particular rotational orientation.

BACKGROUND OF THE INVENTION

Prior art U.S. Pat. No. 3,780,634, issued Dec. 25, 1973, discloses a photographic camera which includes a chamber for receiving a film cartridge, a manually rotatable driver engageable coaxially with rotatable film moving means in a light-tight housing of the film cartridge for manually rotating the film moving means to advance or thrust a filmstrip from the housing for exposure in the camera, and locking means for preventing manual rotation of the driver during exposure of the filmstrip. The locking means has a latch pin which is pivoted into an indexing hole in an indexing gear coupled to the driver, to lock the indexing gear and in turn lock the driver. A button connected to the latch pin must be manually depressed to pivot the latch pin out of the indexing hole in the indexing gear to unlock the driver.

SUMMARY OF THE INVENTION

In contrast to the particular arrangement disclosed in prior art U.S. Pat. No. 3,780,634, one aspect of the invention is directed to apparatus comprising a rotatable driver engageable coaxially with rotatable film moving means in a cartridge housing for rotating the film moving means to advance a filmstrip from the cartridge housing, and locking means for preventing rotation of the driver, characterized in that:

the driver has a key engageable with the film moving means for the driver to rotate the film moving means and engageable with the locking means to prevent rotation of the driver, and the driver supports the key for the key to move between a driving position engaged with the film moving means and disengaged from the locking means and a locking position engaged with the locking means.

Another aspect of the invention is directed to apparatus comprising a chamber for receiving a film cartridge, a rotatable driver engageable coaxially with rotatable film moving means in a housing of the film cartridge for rotating the film moving means to advance a filmstrip from the housing when the film cartridge is received in the chamber, and locking means for preventing rotation of the driver, characterized in that:

the driver is engageable with the locking means to prevent rotation of the driver only when the film cartridge is removed from the chamber.

DETAILED DESCRIPTION OF THE INVENTION

The invention is disclosed as being embodied preferably in a camera intended to be used with a thrust type film cartridge such as disclosed in commonly assigned U.S. Pat. No. 5,384,613, issued Jan. 24, 1995. Because some features of the camera and the film cartridge are therefore known, the description which follows is directed in particular only to those elements forming part of or cooperating directly with the disclosed embodiment. It is to be understood, however, that other elements may take various forms known to a person of ordinary skill in the art.

Figure 1:
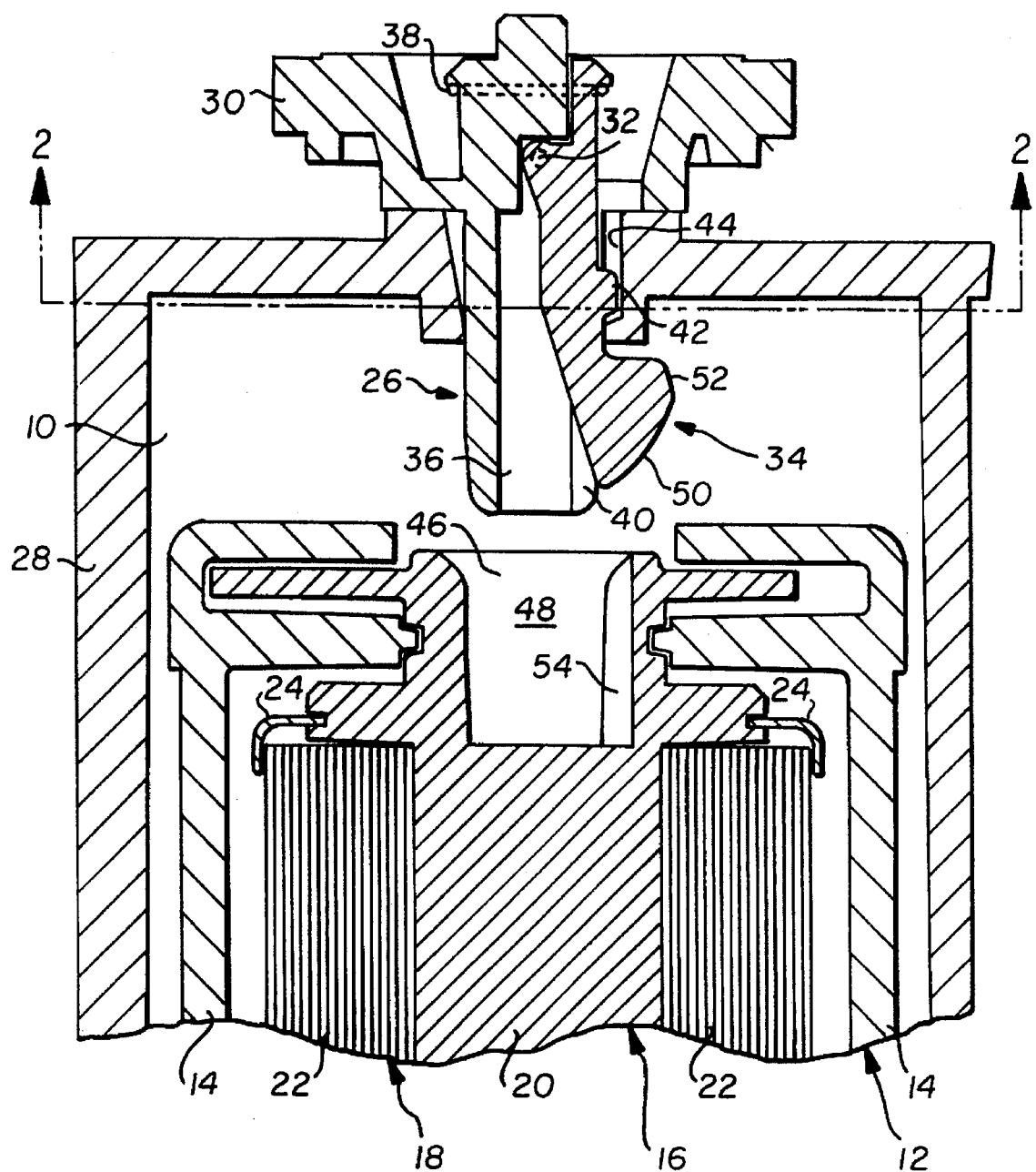
FIG. 1 is an elevation section view of a drive spindle for rotating a film spool of a film cartridge in a camera and to a spindle lock for arresting the spindle according to a preferred embodiment of the invention, showing the drive spindle in a locking position.
Figure 2:
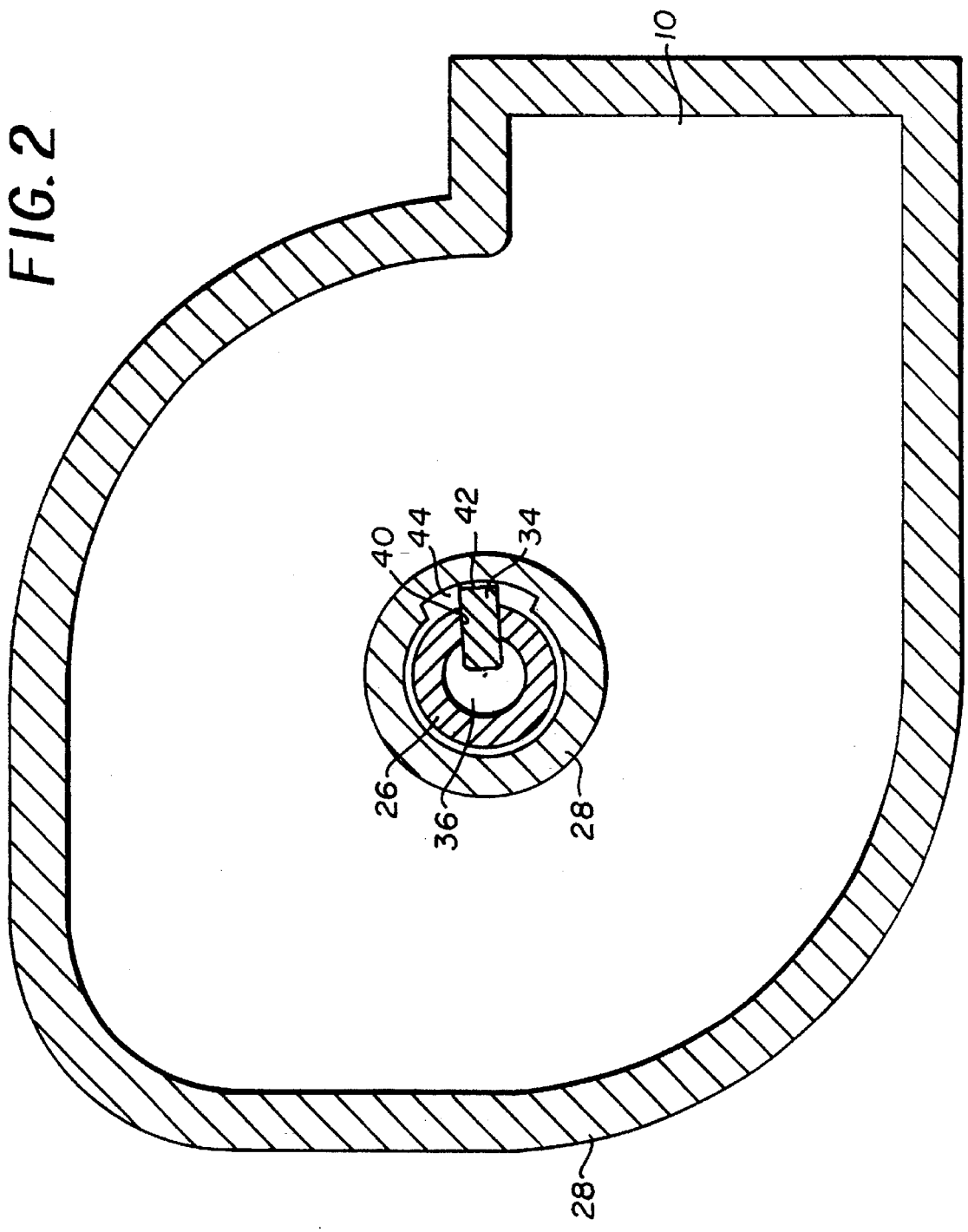
FIG. 2 is a plan section view as seen in the direction of the arrows 2, 2 in FIG. 1.

Referring now to the drawings, FIGS. 1 and 2 show a chamber 10 in a camera for receiving a thrust type film cartridge 12. As disclosed in U.S. Pat. No. 5,384,613, the film cartridge 12 has an opaque housing 14 in which a film spool 16 is rotatably supported. A filmstrip 18 is coiled about a spool core or hub 20 of the film spool 16 to form a number of film convolutions 22, the outermost one of which is held captive by a pair of flexible end flanges 24 (only one shown) rotatably connected to the spool core. When the film spool 16 is first rotated in an unwinding direction, a film stripper (not shown) fixed on the inside of the housing 14 is received beneath a free leading end portion of the filmstrip 18 to begin to release the outermost film convolution from the captivity of the end flanges 24. Thereafter, continued rotation of the film spool 16 in the same direction operates to thrust or propel the free leading end portion of the filmstrip 18 outwardly through an opened film egress slit (not shown) in the housing 14.

Figure 3:
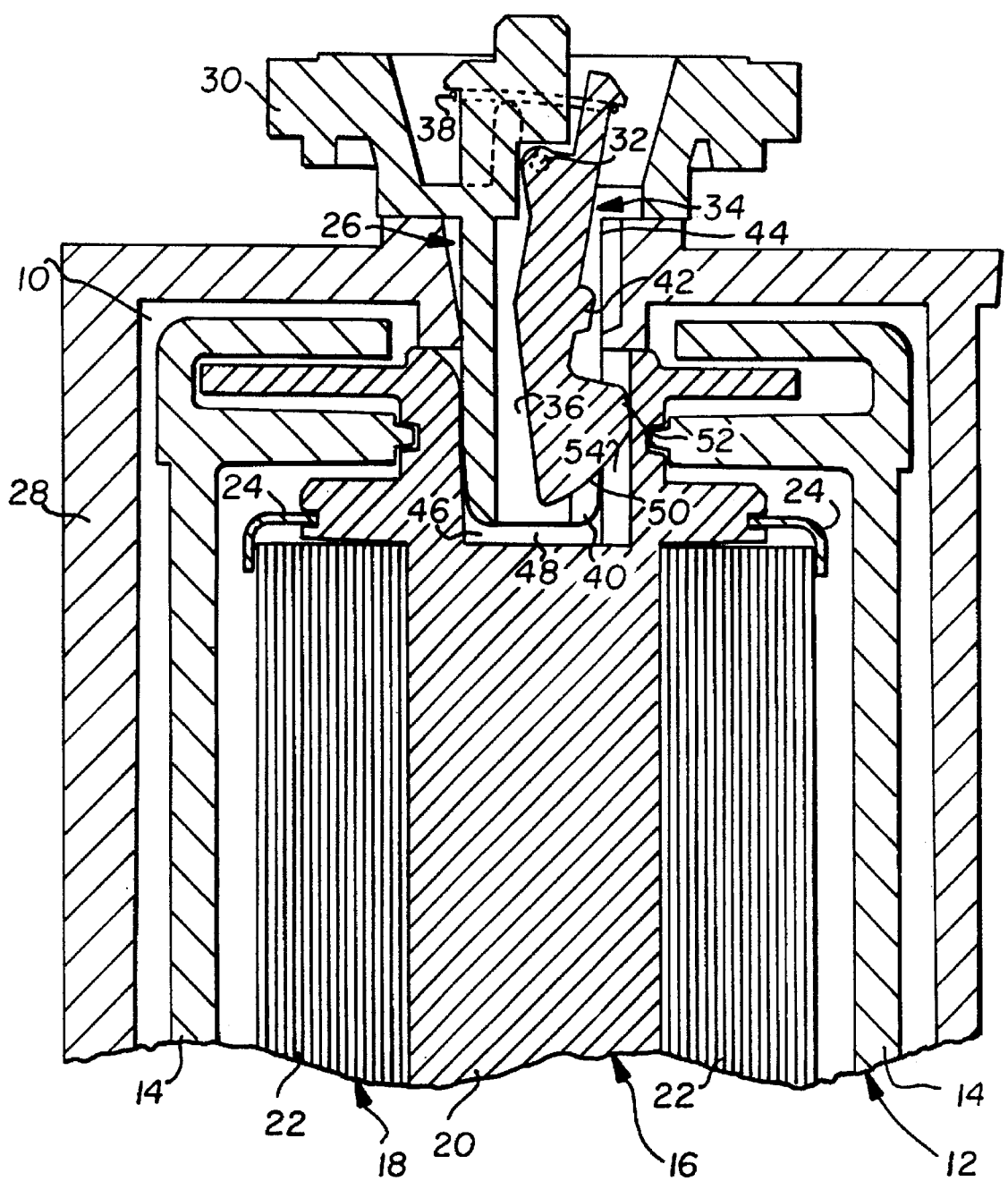
FIG. 3 is an elevation section view similar to FIG. 1, showing the drive spindle in a driving position.

As shown in FIGS. 1-3, a drive spindle 26 is rotatably supported via a frame 28 which defines the chamber 10. The drive spindle 26 protrudes into the chamber 10 and has an integral spindle gear 30 which is intended to be engaged to rotate the drive spindle. A pivot pin 32 pivotally connects a spindle key 34 to the drive spindle 26 within a coaxial hollow 36 in the drive spindle. A return spring 38 biases the spindle key 34 to pivot counter-clockwise in FIG. 1 outwardly through a peripheral slot 40 in the drive spindle 26 from the coaxial hollow 36. FIG. 1 depicts the spindle key 34 spring-urged to a locking position. In this position, the spindle key 34 protrudes from the peripheral slot 40, and a first key portion 42 of the spindle key is located within a fixed arresting cavity 44 in the frame 28 for the frame to engage the spindle key to lock the spindle key in the particular rotational orientation depicted in FIG. 2.

When the film cartridge 12 is inserted in the chamber 10, the drive spindle 26 is received end-first in a coaxial cavity 46 in the spool core 20. As a result, an inner curved wall 48 of the spool core 20 within the coaxial cavity 46 contacts a bottom inclined edge 50 of the spindle key 34 to pivot the spindle key clockwise in FIG. 1 further into the coaxial hollow 36 via the peripheral slot 40 and, thus, out of the locking position shown in FIG. 1. This removes the first key portion 42 from the arresting cavity 44, freeing the drive spindle 26 for rotation.

Rotation of the drive spindle 26 in an unwinding direction within the coaxial cavity 46, similarly moves the spindle key 34 to locate a second key portion 52 of the spindle key opposite a peripheral cavity 54 in the spool core 20 which is open to the coaxial cavity 46. Consequently, the return spring 38 pivots the spindle key 34 counter-clockwise in FIG. 1 outwardly through the peripheral slot 40 from the coaxial hollow 36, moving the second key portion 52 into the peripheral cavity 54 to engage the spindle key with the spool core 20. FIG. 3 depicts the spindle key 34 engaged with the spool core 3 in a driving position. In this position, rotation of the drive spindle 26 in the unwinding direction operates to rotate the film spool 16 to thrust the free leading end portion of the filmstrip 18 outwardly through the opened film egress slit (not shown) in the housing 14 of the film cartridge 12.

The invention has been described with reference to a preferred embodiment. However, it will be appreciated that variations and modifications can be effected by a person of ordinary skill in the art without departing from the scope of the invention.

PARTS LIST 10. cartridge receiving chamber
12. film cartridge
14. cartridge housing
16. film spool
18. filmstrip
20. spool core
22. film convolutions
24. end flange
26. drive spindle
28. frame
30. spindle gear
32. pivot pin
34. spindle key
36. coaxial hollow
38. return spring
40. peripheral slot
42. first key portion
44. arresting cavity
46. coaxial cavity
48. cavity wall
50. bottom inclined edge
52. second key portion
54. peripheral cavity

I claim:

1. Apparatus comprising a rotatable driver engageable coaxially with rotatable film moving means in a cartridge housing for rotating the film moving means to advance a filmstrip from the cartridge housing, and locking means for preventing rotation of said driver, is characterized in that:

said driver has a key engageable with the film moving means for the driver to rotate the film moving means and engageable with said locking means to prevent rotation of the driver, and the driver supports said key for the key to move between a driving position engaged with the film moving means and disengaged from said locking means and a locking position engaged with the locking means.

2. Apparatus as recited in claim 1, wherein said driver is a spindle having a coaxial hollow and a peripheral slot which is open to said coaxial hollow, and said key is movable outwardly through said peripheral slot from said coaxial hollow one distance to the driving position and a further distance to the locking position.

3. Apparatus as recited in claim 1, wherein a return spring continuously biases said key from the driver position to the locking position.

4. Apparatus as recited in claim 1, wherein said locking means has a fixed arresting cavity for receiving said key to engage the locking means to prevent rotation of said driver when the key is moved to the locking position.

5. Apparatus comprising a chamber for receiving a film cartridge, a rotatable driver engageable coaxially with rotatable film moving means in a housing of the film cartridge for rotating the film moving means to advance a filmstrip from the housing when the film cartridge is received in said chamber, and locking means for preventing rotation of said driver, is characterized in that:

said driver is engageable with said locking means to prevent rotation of the driver only when the film cartridge is removed from said chamber.

6. Apparatus as recited in claim 5, wherein said driver has a key supported for unidirectional movement one distance to engage the film moving means for the driver to rotate the film moving means and a further distance to engage said locking means to prevent rotation of the driver.

7. Apparatus as recited in claim 6, wherein a return spring continuously biases said key in the single direction.

\* \* \* \* \*